United States Patent [19]
Shiroyama

[11] Patent Number: 5,336,954
[45] Date of Patent: Aug. 9, 1994

[54] DRAIN UNIT OF STARTER

[75] Inventor: Shigeru Shiroyama, Hyogo, Japan

[73] Assignee: Mitsubishi Denki K.K., Tokyo, Japan

[21] Appl. No.: 813,092

[22] Filed: Dec. 24, 1991

[30] Foreign Application Priority Data

Dec. 28, 1990 [JP] Japan .................. 2-406138

[51] Int. Cl.⁵ .............................................. H02K 5/10
[52] U.S. Cl. ........................................ 310/88; 310/89
[58] Field of Search ................... 310/88, 89, 85, 87

[56] References Cited

U.S. PATENT DOCUMENTS

| | | | |
|---|---|---|---|
| 4,103,660 | 8/1978 | Reese | 123/179 K |
| 4,387,412 | 6/1983 | Woods et al. | 361/27 |
| 4,631,434 | 12/1986 | Asaoka et al. | 310/112 |
| 5,014,657 | 5/1991 | Tsunakawa et al. | 123/185 B |

*Primary Examiner*—Emanuel T. Voeltz
*Assistant Examiner*—Matthew Nguyen
*Attorney, Agent, or Firm*—Sughrue, Mion, Zinn, Macpeak & Seas

[57] ABSTRACT

A drain unit of a starter is a cover of resin material which covers a drain hole of the under surface of said starter. The cover is provided with a plurality of upward projections which are inserted and fixed to the drain hole by the spring function of a fixing hook formed at the top end of each upward projection. A drain outlet is positioned of a horizontal distance from the drain hole, and a water preventing wall defines a labyrinthial construction between the drain hole position and the drain outlet.

1 Claim, 2 Drawing Sheets

DRAIN UNIT OF STARTER

BACKGROUND OF THE INVENTION

This invention relates to a drain unit of a starter.

FIG. 5 is shown a conventional drain unit of the starter disclosed in Japanese Utility Model Laid-Open Patent Application No.2-75958.

In FIG. 5, reference numeral 1 designates a housing of starter. Reference numeral 9 designates a drain part comprising insertion fixing portion 9a and sleeve portion 9b.

The drain part 9 is produced from an elastic material, such as rubber or the like. The sleeve portion 9b is relatively long so as to easily drain and prevent the reverse flow of water or the like.

In the conventional apparatus, when the mounting space of the starter is restricted, the sleeve portion 9b may interfere with other apparatus. At this time, if the length of the sleeve portion 9b is shortened, the internal area of a motor is inundated with water from the outside. Furthermore, since the sleeve is made from an elastic material, the insertion fixing portion 9a fixing the drain part 9 to the starter should be enlarged. Therefore, it is difficult to mount the drain part, and when the drain part portion of the starter is placed on the floor during a transferring process after the mounting, the sleeve may be bent or pushed out of place.

SUMMARY OF THE INVENTION

Accordingly, an object of this invention is to eliminate the above-described difficulties. More specifically, an object of the invention is to provide a drain unit which has high drain and waterproof performance.

The foregoing objects of the invention have been achieved by the provision of a drain unit of a starter which, has:

a cover of resin material which covers a drain hole of the under surface of said starter;

the cover is provided with a plurality of upward projections which are inserted and fixed to the drain hole by the spring function of fixing projection formed at the top end of the upward projections. A drain outlet which is positioned with a horizontal distance position opposite to the drain hole, and a water preventing wall which has a labyrinthial construction between the drain hole position and the drain outlet.

Since the drain unit of the starter of the present invention is produced from a resin material, installation of the starter is easily and tightly performed. And when the drain part of the starter is placed on the floor during a transferring process, the above problems associated with conventional devices do not occur.

DETAILED DESCRIPTION OF THE PREFERRED EMBODIMENT

One preferred embodiment of this invention will be described with reference to the accompanying drawings.

Figure 1:
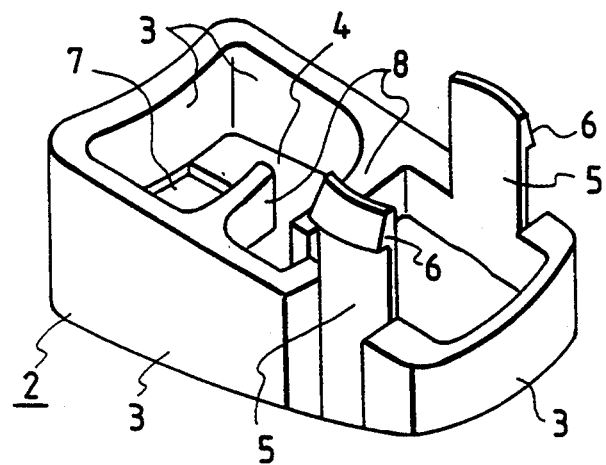
FIG. 1 is a perspective view showing an example of a drain unit according to this invention.
Figure 2:
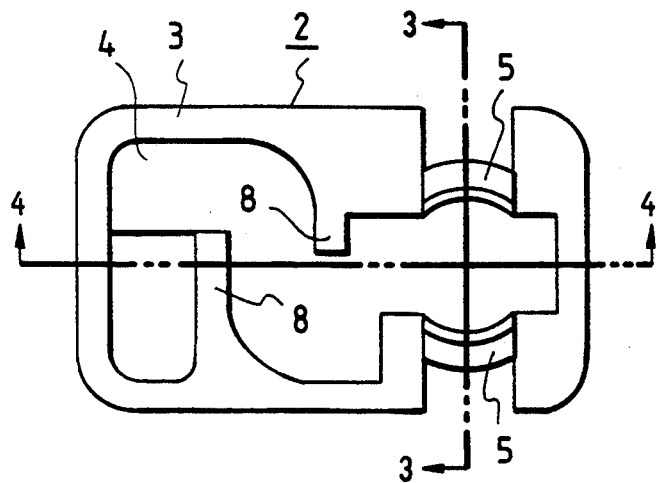
FIG. 2 is a plain view of FIG. 1.
Figure 3:
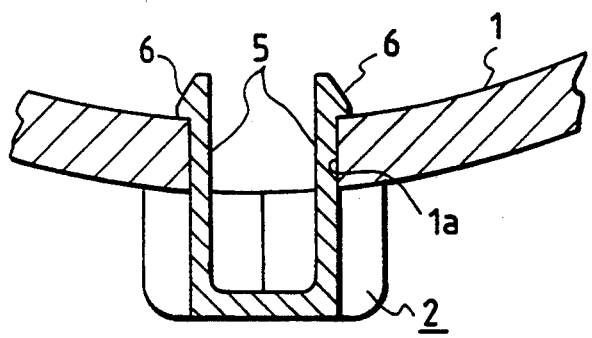
FIG. 3 is a sectional view of line III—III in FIG. 2.
Figure 4:
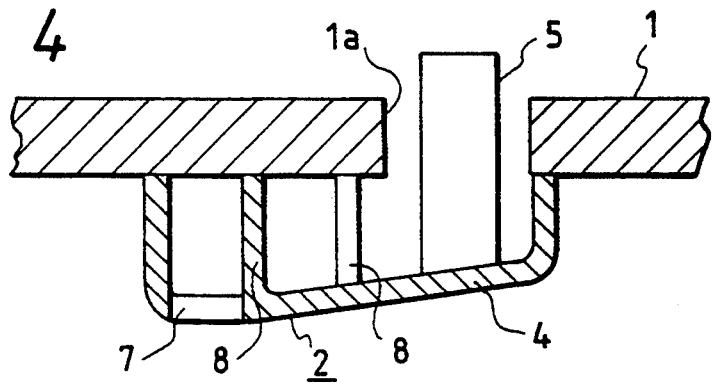
FIG. 4 is a sectional view of line IV—IV in FIG. 2.
Figure 5:
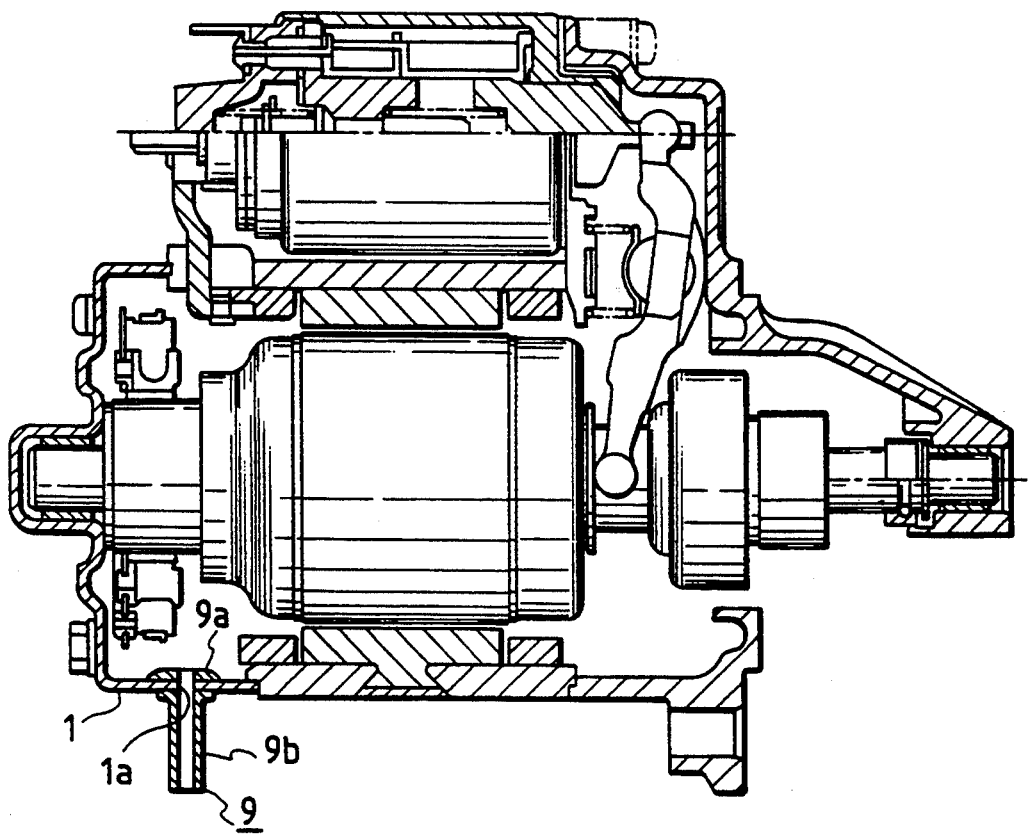
FIG. 5 is a sectional view of the conventional drain.

In FIGS. 1–4 reference numeral 1 designates a housing of the starter unit, and reference numeral 2 designates a drain unit. The drain unit 2 is a cover which is constructed by a side wall 3 and a bottom plate 4. The upper edge of the side wall 3 is concave along the housing 1, so that the cover is tightly fitted to the housing 1 and covers drain hole 1a of the housing 1. Reference numeral 5 designates two projections which are projected upward from the side wall 3 so as to fit the inner diameter of the drain hole 1a. Reference numeral 6 designates a fixing portion formed on each top edge of the projection 5. Reference numeral 7 designates a drain outlet which is provided on the bottom plate 4 and positioned on the opposite side thereof with respect to the projections 5. Reference numeral 8 designates water preventing walls which define a labyrinthial construction for a passage from the position of the projection 5 to the drain outlet 7. At the time, the side wall 3, the bottom plate 4, the projection 5 and water preventing wall 8 are produced from resin material as one integral body. The bottom plate 4 is inclined so as to allow easy to flow for water toward the drain outlet 7.

The assembly between the drain unit and the starter unit is performed by inserting the projection 5 in the drain hole 1a of the housing 1, and locking the fitting portion 6 to the housing 1 by virtue of the spring function of the projection 5.

The drainage from the starter through the drain hole 1a, flows along the bottom plate 4 and is discharged at the drain outlet 7. Alternately, when the drain outlet 7 receives water from the outside, the water hardly invades the inside of the starter to because of the water preventing wall 8.

As was described above, in the drain unit according to the invention, since the drain unit of the cover shape which covers the drain hole of the under surface of the starter housing is produced from resin material, the projection is tightly fixed to the housing of the starter as compared with the rubber conventional device, and the conventional large insertion fixing portion is not necessary. Furthermore, since the resin is slidable on a working table, the drain unit is hardly put out and transformed during a transferring operation.

What is claimed is:

1. A drain unit of a starter comprising:
   a cover having a side wall and a bottom plate, positioned so as to cover a drain hole formed in a bottom portion of said starter;
   a plurality, projections extending upward from said cover, said projections being inserted into and fixed hole by engagement between a fixing hook formed at a top end of said each projection and said bottom portion;
   a drain outlet, provided on said bottom plate, at a position which is offset in a horizontal direction with respect to said drain hole;
   at least one water preventing wall, provided in said cover, so as to define a labyrinthial path between said drain hole and said drain outlet; and
   said drain unit being integrally formed of a resin material.

* * * * *